Aug. 14, 1928.
F. M. BOWERS
WELDER'S SHIELD
Filed Dec. 2, 1926  2 Sheets-Sheet 1
1,680,725
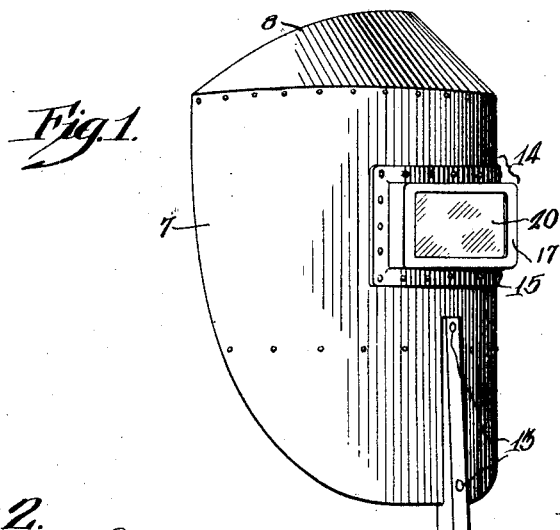
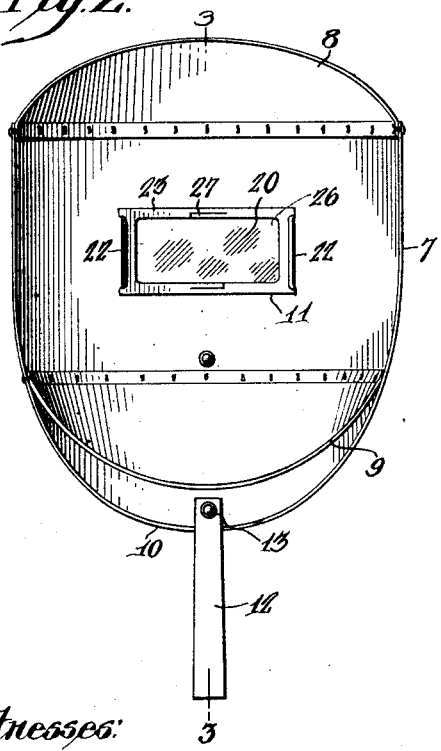
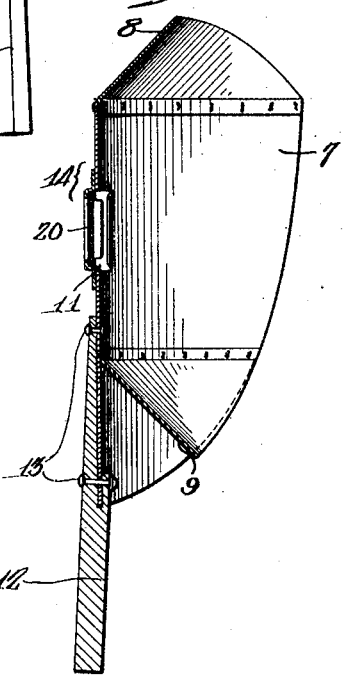
Inventor
Frederick M. Bowers Aug. 14, 1928.
F. M. BOWERS
1,680,725
WELDER'S SHIELD
Filed Dec. 2, 1926
2 Sheets-Sheet 2
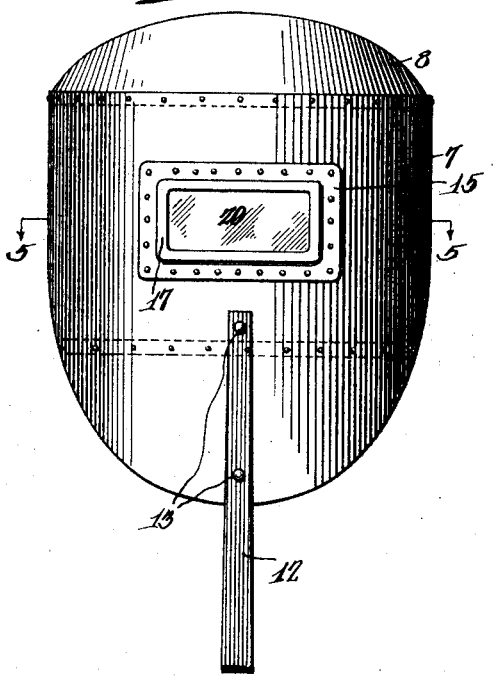
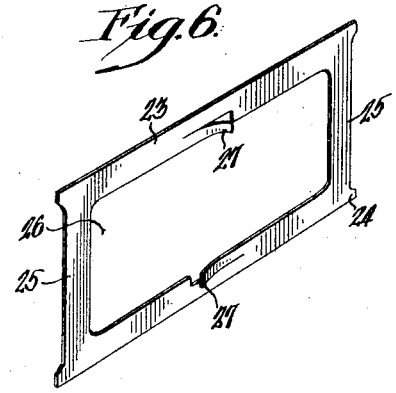
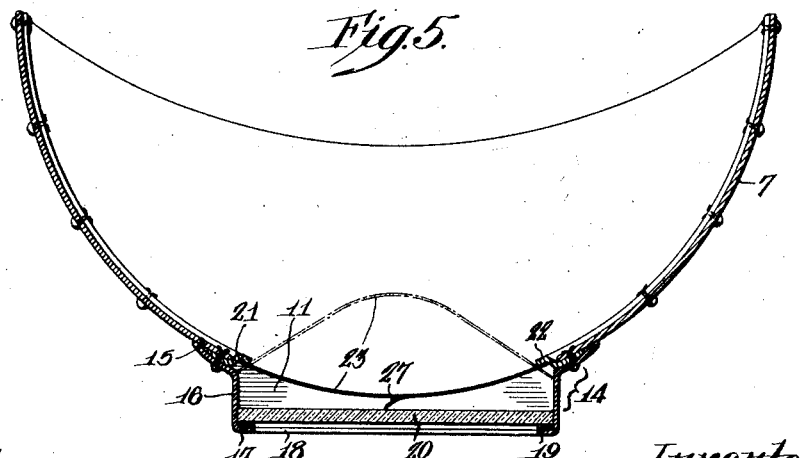
Witnesses:
Walter Chism.
Wesley P. Merrill
Inventor
Frederick M. Bowers
by
Joshua R. H. Potts
his Attorney Patented Aug. 14, 1928.

1,680,725

UNITED STATES PATENT OFFICE.

FREDERICK M. BOWERS, OF CHESTER, PENNSYLVANIA.

WELDER'S SHIELD.

Application filed December 2, 1926. Serial No. 152,121.

My invention relates to welder's shields which are used to protect the faces of workmen from the glare and heat of the welding arc as well as from minute particles of metal which are flying in the air due to the welding or cutting operation.

In certain operations where a helmet would be so cumbersome that it would prevent the welder from getting his eyes near enough the work and on other operations where the actual time of welding is short, a shield is used which the welder holds in position with one hand while operating the welding outfit with the other. It is to this class of shield that my invention pertains.

I am aware that many attempts have been made to produce an efficient welding shield but the shields so far produced have certain disadvantages which have been overcome in the present invention. One of the objections being that the handle is so located that the welder must place same against his chest in order to bring the shield in the proper position.

One of the objects of this invention is to so dispose the handle that the shield may be held in a comfortable position by the operator.

Handles on the shields in use at present are circular in cross section, which makes it difficult for the welder to keep the shield properly aligned due to the heavy cumbersome gloves which he is forced to wear on account of the nature of his occupation.

Another object of my invention is to provide a handle of angular cross section which may be easily grasped and which will enable the welder to hold the shield in the desired position without exerting undue pressure upon the handle.

Another great disadvantage found in the shields in use at present lies in the fact that the face and eyes are not sufficiently protected from reflected beams of light or from falling or deflected pieces of hot metal.

Another object of my invention is to provide a protector at the top of the shield which will overlap the head and a second protector fitted inside the shield in such a manner that the chin of the operator will be positioned above it; thus providing protection from metal and glare from both above and below the face of the operator.

Another object of the invention is to provide suitable means whereby one or more thicknesses of glass may be secured in the shield by means of the same retainer and so design these means that the changing of the glasses in the shield may be accomplished by merely springing a resilient member from and into the frame.

These objects, and other advantageous ends which will be described hereinafter, I attain in the following manner, reference being had to the accompanying drawings in which Figure 1 is a perspective view of a preferred embodiment of my improved welder's shield, Figure 2 is a rear view of the shield shown in Figure 1 and Figure 3 a section on line 3—3 of Figure 2.

Figure 4 is a front view of the shield shown in Figure 1,

Figure 5 a section on line 5—5 of Figure 4, and

Figure 6 a perspective view of a glass retaining element forming a part of my invention, which is applied as shown by the dot-and-dash lines in Figure 5.

Referring now to all the views simultaneously, 7 is the body part of the shield which is arcuate in cross section as plainly shown in Figure 5. An upper guard 8 is secured along the upper edge of the body part and extends upwardly and inwardly as plainly shown in Figures 1, 2 and 3. The shape of this piece is substantially the same as a segment of the base of a cone. A lower guard 9, of substantially the same shape as the upper guard, is secured to the body part 7 at a point substantially midway between the bottom 10 and an opening 11 located slightly above the center line of the body part 7. As illustrated, guard 9 projects downwardly and inwardly to extend beneath the chin and protect the face of an operator. This arrangement obstructs fumes and light entering from below and due to the extra thickness of material, it affords added protection against the heat of the arc. The operator may rest his chin on the guard and maintain a constant distance between his eyes and glass 20. As is evident, the guard is fastened to the shield from one extremity to the opposite extremity, constituting a direct tie across the shield, thereby adding strength and rigidity to the device and assisting it in maintaining its shape, thus enabling it to more firmly mount a handle. A handle 12 is secured to the bottom of the body part by means of rivets 13 and extends downwardly and outwardly so that the welder may hold the shield in the proper position without having his hand come in contact with his chest, as is the case with the shields in use at present. While I have shown the handle 12 as being rectangular in cross section, it will be readily understood that any angular section, or other means of providing an irregular surface, might be employed.

The handle, body part and guards are preferably made of fibre or a similar opaque unbreakable material as the shields are usually subjected to rough usage. The material selected should also be heat resisting to a certain extent due to the proximity of the welding arc or the flame of the acetylene torch when the shield is in use.

Surrounding the opening 11 is a metallic frame 14 having a base 15 which conforms to the outline of the body part. A frame portion 16 extends forwardly from the base 15 and terminates in an inturned front flange 17 which surrounds a sight opening 18 aligning with opening 11.

A gasket 19 of semi-resilient material is placed against the inside of the flange 16 in order to keep the glass 20 from coming in contact with the metal frame. A pair of lugs 21 are secured between the base 15 and the body part 7 and extend inwardly, terminating in flanges 22 which are wholly within the shield. A retainer 23, preferably made of spring steel or spring brass, is positioned between the flanges 22 and the length of the retainer is but slightly less than the distance between the flanges measured along the inner face of the body part 7 and consequently it is considerably longer than the distance between these flanges measured on a straight line. An extension 24 is formed on each corner of the retainer 23 and adapted to overlap the ends of the flanges 22 when the ends 25 of the retainer 23 are brought into contact with the face of the lugs 21. An opening 26 is formed in the retainer and is adapted to correspond with the sight opening 18 when the retainer is in place. Spring fingers 27, formed integral with the retainer 23, are curved outwardly as shown in Figures 5 and 6 and are adapted to engage the glass 20 and hold same firmly against the gasket 19. These fingers also allow for the use of glass of different thicknesses or using more than one piece of glass.

While I have illustrated and described a preferred embodiment of my improved welder's shield, it will be readily understood that various alterations and modifications may be made therein without departing from the spirit of the invention, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. A welder's shield comprising a body part of arcuate outline having a sight opening therein, said body part being of a length to extend perpendicularly from the forehead to below the chin, an upper guard extending inwardly from the top of the body part to protect the head, a lower guard secured within and to the body part between the bottom thereof and the sight opening, said lower guard projecting inwardly to extend beneath the chin of the welder and act as a reinforcement to the body part, and a projecting handle attached to the lower portion of the body part.

2. A welder's shield comprising a vertical body part bowed transversely and having a sight opening therein, a guard fastened to the upper edge of the body part extending inwardly to protect the head, a second guard substantially identical with the first and fastened to and within the body part below the sight opening, the second guard extending inwardly to project under the chin, and both of said guards acting as reinforcements to the body part.

In testimony whereof I have signed my name to this specification.

FREDERICK M. BOWERS.